United States Patent
Olevitch et al.

[15] 3,703,813
[45] Nov. 28, 1972

[54] LASER BEAM REFLECTOR SYSTEM
[72] Inventors: Albert Olevitch, 3100 Early Road, Dayton, Ohio 45415; Darrell R. James, 12007 Prospect N.E., Albuquerque,, N. Mex. 87110
[22] Filed: Oct. 14, 1971
[21] Appl. No.: 189,285

[52] U.S. Cl. ............................62/3, 165/2, 263/52, 315/111, 331/94.5, 350/288, 350/310
[51] Int. Cl. ............................F25b 21/00, H01s 3/04
[58] Field of Search .........350/288, 310; 62/3; 165/1, 165/2; 331/94.5; 263/52; 315/111

[56] References Cited

UNITED STATES PATENTS

| | | | |
|---|---|---|---|
| 2,605,377 | 7/1952 | Kaehni et al. | 62/3 UX |
| 3,224,485 | 12/1965 | Bloomgren et al. | 263/52 |
| 3,224,497 | 12/1965 | Bloomgren et al. | 165/2 |
| 3,516,011 | 6/1970 | Hadwin | 331/94.5 |

Primary Examiner—David Schonberg
Assistant Examiner—John W. Leonard
Attorney—Harry A. Herbert, Jr. et al.

[57] ABSTRACT

An electrically conductive laser beam reflector is cooled by a high voltage electrostatic field created between the reflector and a probe spaced from the surface of the reflector on the same side of the reflector as the impinging laser beam. The cooling effect by the electrostatic field is of essentially the same distribution as the heating effect of the laser beam thus eliminating different and varying temperatures gradients in the reflector and the resulting distortions in the beam.

1 Claim, 5 Drawing Figures

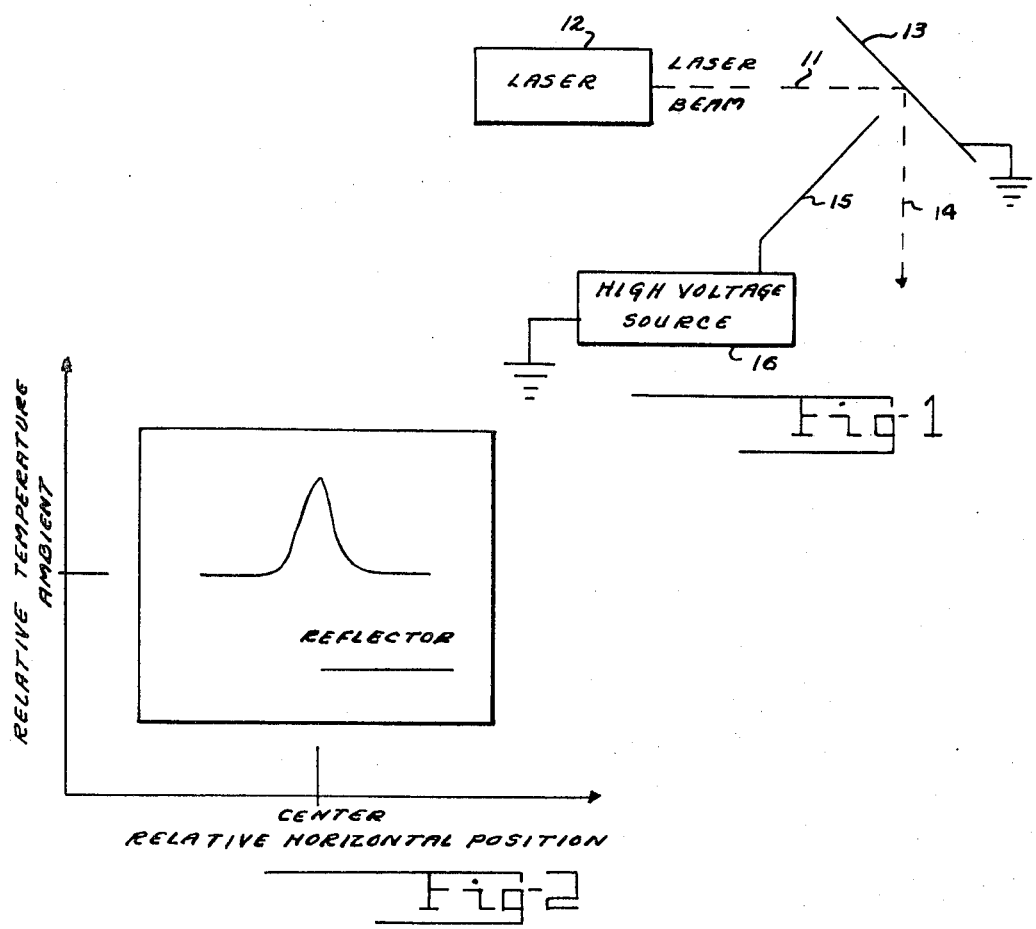
Fig-1
Fig-2
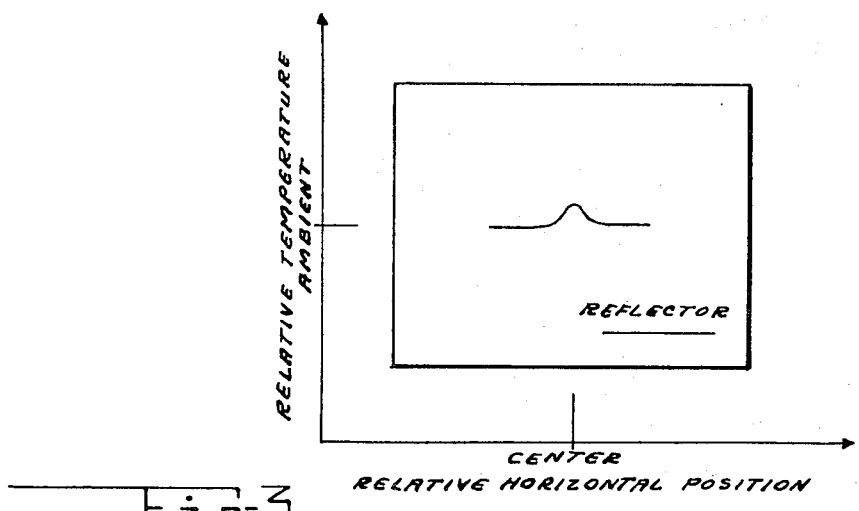
Fig-3
INVENTORS
ALBERT OLEVITCH
DARRELL R. JAMES
ATTORNEYS

LASER BEAM REFLECTOR SYSTEM

BACKGROUND OF THE INVENTION

The field of the invention is in reflectors for laser beams.

Reflectors (also frequently termed simply mirrors) for laser beams are extensively used. Since no reflector is a perfect reflector, such that all the energy impinging on the reflector is reflected, heating of the reflector is a serious problem. Particularly is this true for the reflectors used with high energy laser beams where frequently the heating causes serious distortions in the reflective surface. Various attempts to cool the surfaces on which laser beams are directed have not been very successful due to the distortions created in the reflective surface caused by the cooling created over the surface not having the same distributive effect as the heating caused by the beam. This has resulted in "hot spots" and many changes in the temperature gradient across the surface of the reflector, or many small gradients going in various directions over the reflector surface. Liquid cooling by the flow of a liquid cooling medium, such as water, in tubes on the backside of the reflector has been used. Ripples appear in the reflector surface with a cool line over each tube and a hot area with a temperature peak in the areas between the tubes. Likewise, air from a fan blowing directly across the face of the reflector, or from jets positioned along the edge, has been used. While the cooling of the reflector in this manner is generally more uniform than with the liquid tubes, the surface still takes on a serious distortion due to the localized hot area where the laser beam is impinging.

U.S. Pat. No. 3,516,011 issued to patentee J. F. Hadwin is an example of the use of air in cooling a laser system. U.S. Pat. No. 3,224,497 issued to patentees O. C. Blomgren, Sr., et al., is an example of electrostatic cooling.

SUMMARY OF THE INVENTION

A laser beam reflector system in which the heating effect on the reflector caused by the laser beam is effectively neutralized by an electrostatic cooling effect having similar but opposite characteristics to the beam heating effect provides essentially a distortion-free beam reflector.

BRIEF DESCRIPTION OF THE DRAWING

FIG. 1 is a block-schematic diagram of an embodiment of the invention;

FIG. 2 is a representative plot of the temperature caused by the heating of a reflector surface (without additional cooling) brought about by an impinging laser beam;

FIG. 3 is a representative temperature plot of the reflector represented in FIG. 2 with partial electrostatic cooling;

DESCRIPTION OF THE PREFERRED EMBODIMENT

Figure 4:
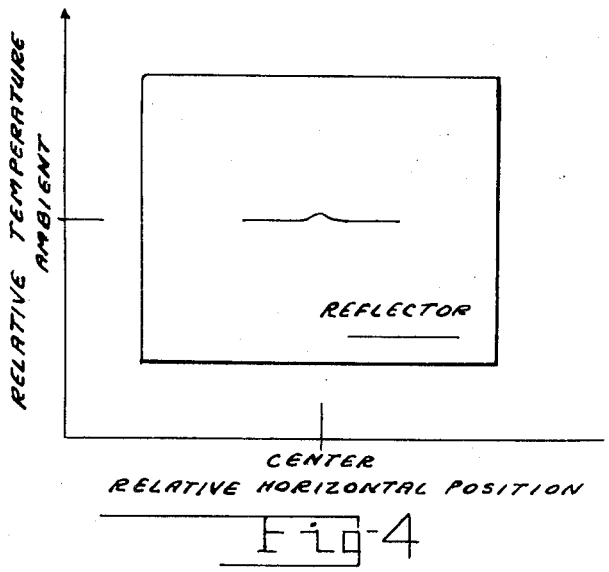
FIG. 4 is a representative temperature plot of the same reflector with the electrostatic cooling substantially neutralizing the heating caused by the laser beam.

Referring to FIG. 1, when the beam 11 from laser 12 is directed on reflector 13, not all of the energy of beam 11 is contained in reflected beam 14. No reflector is perfect. The energy loss in the beam reflection appears as heat in the reflector causing a temperature rise in the reflector. This temperature rise causes thermal gradients to appear in the reflector and due to thermal expansions distortion in the reflector surface resulting in distortions in the reflected beam. Data for temperature measurements showing the effectiveness of this invention may typically be obtained by thermocouples on the back surface of the reflector and/or by a conventional infrared scanner temperature measuring device. As an example of one embodiment of the invention having a one-eighth inch thick polished aluminum reflector and with a laser beam power of approximately 33 watts, with a beam area of approximately 1 square centimeter, directed on the reflector the temperature of the reflector under the laser beam increased 23.3°C over the ambient temperature of 21°C (i.e., without the electrostatic cooling). With the probe 15 charged positively (generally positively is preferred, it may be either positive or negative), to a potential of approximately 21 kilovolts by the conventional high voltage power source 16 the temperature of the reflector at the location of the beam impingement dropped 10°C (i.e., from 44.3°C without the electrostatic cooling; to 34.3°C with electrostatic cooling). This represents a 43 percent cooling efficiency $$\left(\frac{10° \text{ cooling}}{23.3° \text{ heating}} \times 100\%\right)$$

for a mirror which is not much warmer than the cooling media.

In another embodiment of the invention the reflector 13 is a 2-mil stainless steel mirror, the probe is a pointed one-sixteenth inch steel rod (the material and diameter of the probe are not critical, any suitable conductor may be used such as aluminum, brass, and copper; preferably it should be formed to a blunt point at the discharge end), positioned so as to be spaced approximately 1 3/16 inches (not critical) from the reflector, and the high voltage source 16 is variable from zero potential to approximately 14 kilovolts. The back surface of the reflector was scanned with a conventional infrared scanner to obtain relative temperatures across the reflector. A fifty watt $CO_2$ laser with approximately a 1 square centimeter beam was directed at the center of the reflector. A typical IR temperature profile without the electrostatic cooling, across the center of the reflector is shown in FIG. 2. (With a uniform laser beam the temperature profile in a vertical direction through the center would be substantially the same.) With a positive 7 kilovolt potential applied to the probe the temperature profile shown in FIG. 3 is obtained, with all other parameters remaining the same. Raising the potential to 14 kilovolts produces the profile shown in FIG. 4. The temperature peak of FIG. 4 is approximately one-twentieth that of FIG. 2. In this particular embodiment increasing the electrostatic potential over 14 kilovolts had negligible effect on further lowering the temperature. Also, obviously, the distortion in the reflected laser beam is much less when the reflective system as represented in FIG. 4 is used than with the conventional uncooled reflector as represented by FIG. 2.

The electrostatic cooling has been found to be caused by an increase in the convective heat transfer from a hot object to a cooling fluid. The cooling fluid in the previous embodiments is the ambient air. Current flow through a corona or low density plasma is required for effective cooling. Obviously, the electric field must not be so great as to cause breakdown or sparking. The efficiency of electrostatic cooling depends upon the thermal gradient through which the convective cooling takes place. The higher the gradient ($\Delta T$), the more power which can be removed by the electrostatic cooling. For example, using the data enumerated in the first described specific embodiment:

$$qc/A = hc\Delta T$$

where
$qc/A$ = power per unit area
$hc$ = convective heat transfer coefficient
$\Delta T$ = temperature difference between the hot object (reflector) and the cooling media.

The specific reflector was approximately 90 percent reflective, thus 10 percent of the thirty-three watts was absorbed and was dissipated at a rate which maintained a $\Delta T$ of 34.3°C. Thus, $$3.3 \text{ watts/cm}^2 = hc\ 34.3°C$$

or $hc = 0.1$ watts/cm$^2$°C (approximately) for this particular reflector structure.

THE NEW HOT MIRROR CONCEPT

Figure 5:
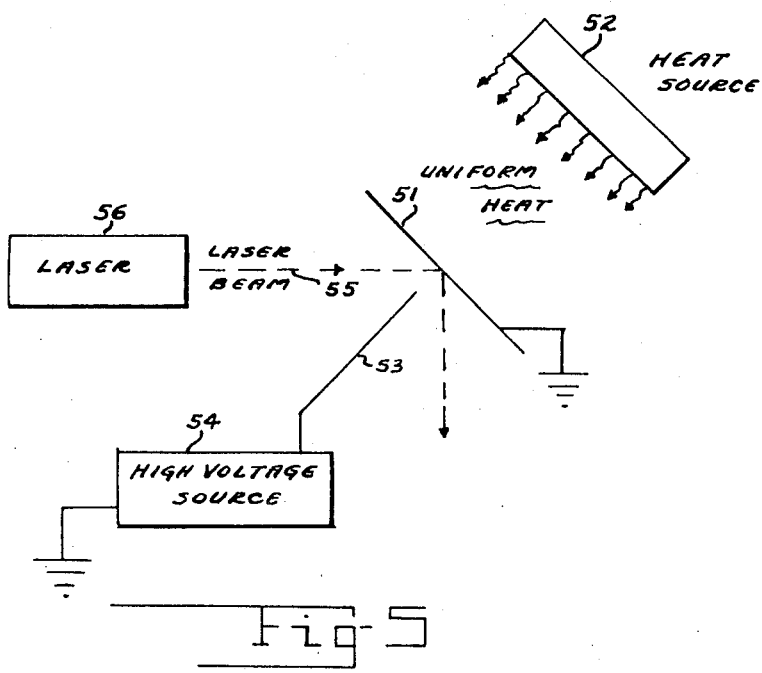
FIG. 5 is a block-schematic diagram of an embodiment of the invention with an external heat source.

From the foregoing it is apparent that with a reflector having the enumerated characteristics at a temperature of 500°C above the ambient approximately 50 watts per square centimeter of heat power can be removed by electrostatic cooling. That is: $qc/A = (0.1)(500) = 50$ watts/cm$^2$. It is to be noted that this is at a stabilized temperature of 500°C that 50 watts/cm$^2$ can be continuously removed by electrostatic cooling. Now, when a reflector uniformly heated by an external heat source to 500°C has a laser beam directed on it in reflective relationship the temperature of the area of beam impingement will rise above the 500°C. In fact, a 0.5 KW/cm$^2$ beam impinging on the reflector that has a 10 percent loss (i.e., 90 percent reflective) will produce an additional 50 watts/cm$^2$ of heat at the point of impingement. Note that this is just the amount of heat power that the particular foregoing electrostatic cooling will remove and the reflector will remain at a uniform 500°C across its surface with the effect of the laser beam tending to heat being just balanced by the electrostatic cooling. FIG. 5 is a block-schematic diagram of an example of this embodiment. The reflector 51 is uniformly heated by the conventional external heat source 52 to provide uniform heating of the reflector without the impinging laser beam. The electrostatic corona-plasma field created between the probe 53 and the reflector 51 tends to cool the reflector in the area in front of the probe when the high voltage source 54 is turned on. The laser beam 55 tends to heat the same area when the laser 56 is energized. The two cancel each other so nicely because a single ended probe perpendicular to a flat surface produces a Gaussian cooling profile and the beam intensity of conventional lasers is also Gaussian in profile. It is generally desirable to have a variable high voltage source and a variable external heat source, particularly if the power in the laser beam is varied or not precisely known, so as to be able to match the cooling effect to the heating effect and not over-cool the area of laser beam impingement.

Obviously, the better the reflector to begin with, the better this invention operates. Thus, mirrors (reflectors) which have low thermal conductivity and low thermal expansion coefficients such as CerVit with a several-thousand angstrom reflective metallic coating are preferred. Other composites such as platinum coating (several-thousand angstroms) on a carbon, graphite or ceramic substrate are useful for operating temperatures up to or above 2,000°C.

For laser beams not having the conventional Gaussian heat distribution effect, the corona field may be shaped by conventional well known electric and/or magnetic fields so that the charged particle distribution of the cooling field matches the characteristics of the laser beam to provide zero or near zero temperature differences on the surface of the reflector and thus negligible distortion in the laser beam. By appropriately shaping the corona field which defines the cooling field, cavity mirrors in which the radiation beam is reflected normal to the mirror surface may be cooled to provide a uniform temperature across the mirror surface. In place of air as the cooling media, as in the previously described embodiments, an injected gas, and/or the lasing media itself may be used as the cooling media.

We claim:
1. An electrostatically cooled laser reflector system comprising:
   a. a low thermal conductivity laser reflector having an electrically conductive metallic coated reflective surface for reflecting an impinging laser beam, said impinging laser beam forming a heating effect profile in said reflector;
   b. an electrically conductive probe positioned normal to said metallic coated surface in spaced apart relationship from the position on the surface of the reflector of said impinging laser beam;
   c. a gaseous fluid media between said probe and said reflective surface;
   d. means for uniformly heating said reflector to a predetermined higher temperature than said gaseous media; and
   e. means for electrostatically creating a low density plasma in said gaseous media between the said probe and said reflective surface, comprising a high voltage direct current source operatively connected to said probe and said reflector, respectively, with means for varying the voltage potential of said source such that said plasma has a cooling effect profile on said reflector that substantially matches said heating effect profile of the laser beam whereby the temperature of the reflector is maintained substantially uniform across its surface at said predetermined higher temperature.

* * * * *